(12) United States Patent
Seok

(10) Patent No.: US 7,702,367 B2
(45) Date of Patent: Apr. 20, 2010

(54) METHOD AND MOBILE TELECOMMUNICATION HANDSET FOR SWITCHING BETWEEN SCREENS USING AN ABBREVIATION KEY

(75) Inventor: Ji-Jeong Seok, Busan (KR)

(73) Assignee: LG Electronics, Inc., Seoul (KR)

( * ) Notice: Subject to any disclaimer, the term of this patent is extended or adjusted under 35 U.S.C. 154(b) by 246 days.

(21) Appl. No.: 11/556,167

(22) Filed: Nov. 2, 2006

(65) Prior Publication Data

US 2007/0097083 A1     May 3, 2007

(30) Foreign Application Priority Data

Nov. 2, 2005   (KR) .................... 10-2005-0104602

(51) Int. Cl.
G06F 3/00      (2006.01)
H04W 4/00     (2009.01)
H04B 1/38      (2006.01)

(52) U.S. Cl. .................. 455/566; 715/709; 455/466; 455/564

(58) Field of Classification Search ............. 455/466; 709/227
See application file for complete search history.

(56) References Cited

U.S. PATENT DOCUMENTS

| 6,075,992 A * | 6/2000 | Moon et al. ............ 455/455 |
| 2006/0064462 A1* | 3/2006 | Chen ..................... 709/206 |
| 2006/0139448 A1* | 6/2006 | Ha et al. ................. 348/51 |
| 2006/0288107 A1* | 12/2006 | Klassen et al. ........ 709/227 |

FOREIGN PATENT DOCUMENTS

KR      2003010249 A   *   2/2003

* cited by examiner

*Primary Examiner*—Nick Corsaro
*Assistant Examiner*—Munsoon Choo
(74) *Attorney, Agent, or Firm*—Lee, Hong & Degerman, Kang & Waimey

(57) ABSTRACT

Provided are a method for switching between screens using an abbreviation key in a mobile telecommunication and a mobile telecommunication capable of switching between screens using an abbreviation key. The present invention makes it possible to read again the received short message during the time of composing a short message by pressing at least one abbreviation key, and to switch to the composing-unfinished short message to resume the composing of the short message by pressing at least one abbreviation key. This provides the user with an advantage of promptly switching between screens in comprising the short message.

15 Claims, 7 Drawing Sheets

FIG. 5A

COMPOSE MESSAGE

Contents

*What are you going to do today?*

Message Type

| Menu | Send | US/KR |

PRESS AN ABBREVIATION KEY ⇒

NEW MESSAGE

Contents

*How is it going? Keep in touch with me*

From

*Sunny*

| Menu | Reply | Forward |

FIG. 5B

NEW MESSAGE

Contents

*How is it going? Keep in touch with me*

From

*Sunny*

| Menu | Reply | Forward |

PRESS AN CANCELLATION KEY ⇒

RECEIVED MESSAGE

1. *How is it going? K...*
2. *Let me know your ...*
3. *How is it going?*
4. *Please contact me !*
5.
6.

| Menu | Select | Delete |

METHOD AND MOBILE TELECOMMUNICATION HANDSET FOR SWITCHING BETWEEN SCREENS USING AN ABBREVIATION KEY

CROSS REFERENCE TO RELATED APPLICATION

Pursuant to 35 U.S.C. §119(a), this application claims the benefit of earlier filing date and right of priority to Korean Application No. 10-2005-0104602, filed Nov. 2, 2005, the contents of which are hereby incorporated by reference herein in their entirety.

BACKGROUND OF THE INVENTION

1. Field of the Invention

The present invention is related to a mobile telecommunication handset, and more particularly to a method for switching between screens using an abbreviation key in a mobile telecommunication and a mobile telecommunication capable of switching between screens using an abbreviation key.

2. Description of the Related Art

A short message propagates over radio channels of mobile networks. The use of the short message in a mobile telecommunication handset has been popular because a user can communicate with the other party on the line without disturbing his/her neighbor in a quiet environment and send information to the other party without presence of the other party on the line. In addition, data communication is less costly and more convenient, compared with voice communication. This allows the rapid growth in the demand for the short message service.

The general method of sending and receiving the short message in the mobile telecommunication handset is now described To compose a short message, the user selects a message key and goes to a message-composing screen form the menu. After finishing composing the short message, the user inputs a recipient's telephone number. Finally, the user sends the short message to the recipient by pressing a "SEND" key.

To read a received short message, the user presses the message key and goes to an incoming mail box. The user selects the received short message to read from a list of received messages.

However, the user often needs to read again the received short message during the composing of a short message to make certain of the contents of the received short message. That is, the user may want to make certain of the contents of the received short message while he composes a short message in response to the received short message. Otherwise, the user may want to make certain of the contents of a most-recently received short message or a certain received short message, while he compose a short message. In these cases, the user has to quit composing the short message by pressing an END key or a key performing the same function as the END key. The user is prompted to answer to a message "SAVE or QUIT WITHOUT SAVING'. Then, the user has to go through several screens by pressing several keys before reading again the received short message from the incoming mail box.

The user quits reading again the received short message after making certain of the contents of the received short message, by pressing the END key. When he wants to resume composing the short message, the user has to select the message key from the main menu to go to temporal storage box in which the received short message is temporarily stored. The user proceeds to compose the composing-unfinished short message which is temporarily stored.

The conventional method for switching between screens when composing the short message and when reading the received short message, as above described, requires two or more phase to go through and two or more keys to press, thereby causing the user a lot of inconvenience in composing the short message.

SUMMARY OF THE INVENTION

An object of the present invention is to provide a method for conveniently switching to a screen for reading a received short message during a composing of a short message using an abbreviation key in a mobile telecommunication handset and a mobile telecommunication handset capable of conveniently switching to a screen for reading a received short message during the composing of a short message using an abbreviation key using an abbreviation key.

Another object of the present invention is to provide a method for conveniently switching back to a short message composing screen after reading a received short message using an abbreviation key in a mobile telecommunication handset and a mobile telecommunication handset capable of conveniently switching back to a short message composing screen after reading a received short message using an abbreviation key According to an aspect of the present invention, there is provided a mobile telecommunication handset capable of switching between screens using an abbreviation key, including a display unit and a keypad including at least one abbreviation key to press to switch directly to an incoming mail box or a received short message to display the contents of the received short message during the composing of a short message.

According to another aspect of the present invention, there is provided a mobile telecommunication handset capable of switching between screens using an abbreviation key, including a transmitting/receiving unit transmitting and receiving a voice call or a data call containing a short message, a storing unit storing various information including a short message, an inputting unit enabling the information to be input, including at least one abbreviation key, a controlling unit enabling an incoming mail box to be displayed on a display unit, and the display unit displaying the information for a user and being enabled by the controlling unit to switch directly to displaying the incoming mail box from displaying a short message composing screen.

According to another aspect of the present invention, there is provided a method for switching between screens using an abbreviation key, including pressing a first abbreviation key preset to perform a switching function during the composing of a short message, storing temporarily the composing-unfinished short message, and displaying a received short message or a list of received short messages.

The method for switching between screens using an abbreviation key may further include pressing a second abbreviation key during the displaying of the list of the received short messages and displaying the composing-unfinished message which is temporarily stored.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 5A through 5C are exemplary views helping explain about the method of switching between screens using an abbreviation key in the mobile telecommunication handset and another exemplary case where the method is applied to the mobile telecommunication handset.

DETAILED DESCRIPTION OF PREFERRED EMBODIMENTS

Reference will now be made in detail to the preferred embodiments of the present invention, examples of which are illustrated in the accompanying drawings.

Figure 1:
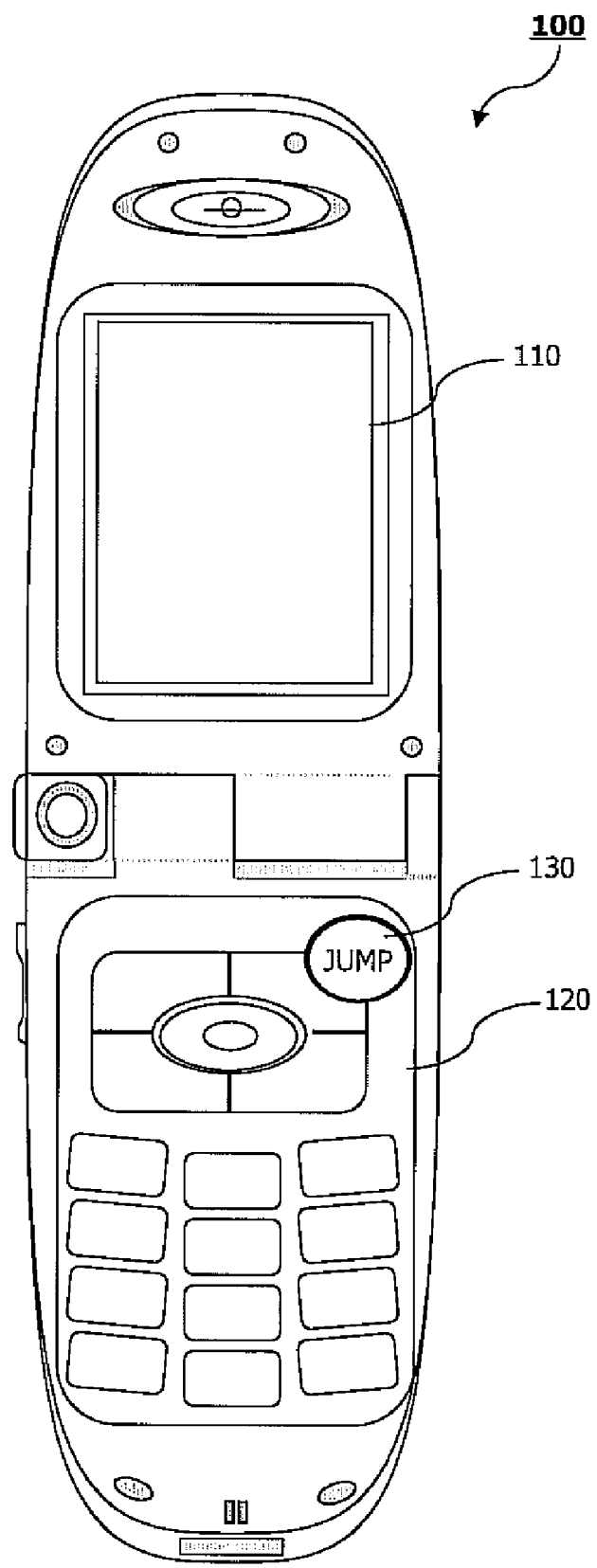
FIG. 1 is FIG, 1 is a view showing an outward appearance of a mobile telecommunication handset capable of switching between screens using an abbreviation key.

FIG. 1 is a view showing an outward appearance of a mobile telecommunication handset capable of switching between screens using an abbreviation key.

As shown in FIG. 1, the mobile telecommunication handset 100 includes a display unit 110, a keypad 120, and at least one abbreviation key 130 to press to switching directly to a received message storing box such as an incoming mail box or a received message during the time of composing a message.

The abbreviation key 130 is set to temporally store the composing-unfinished message and displays the received message when pressed during the composing of the message in response to the received message.

Figure 2:
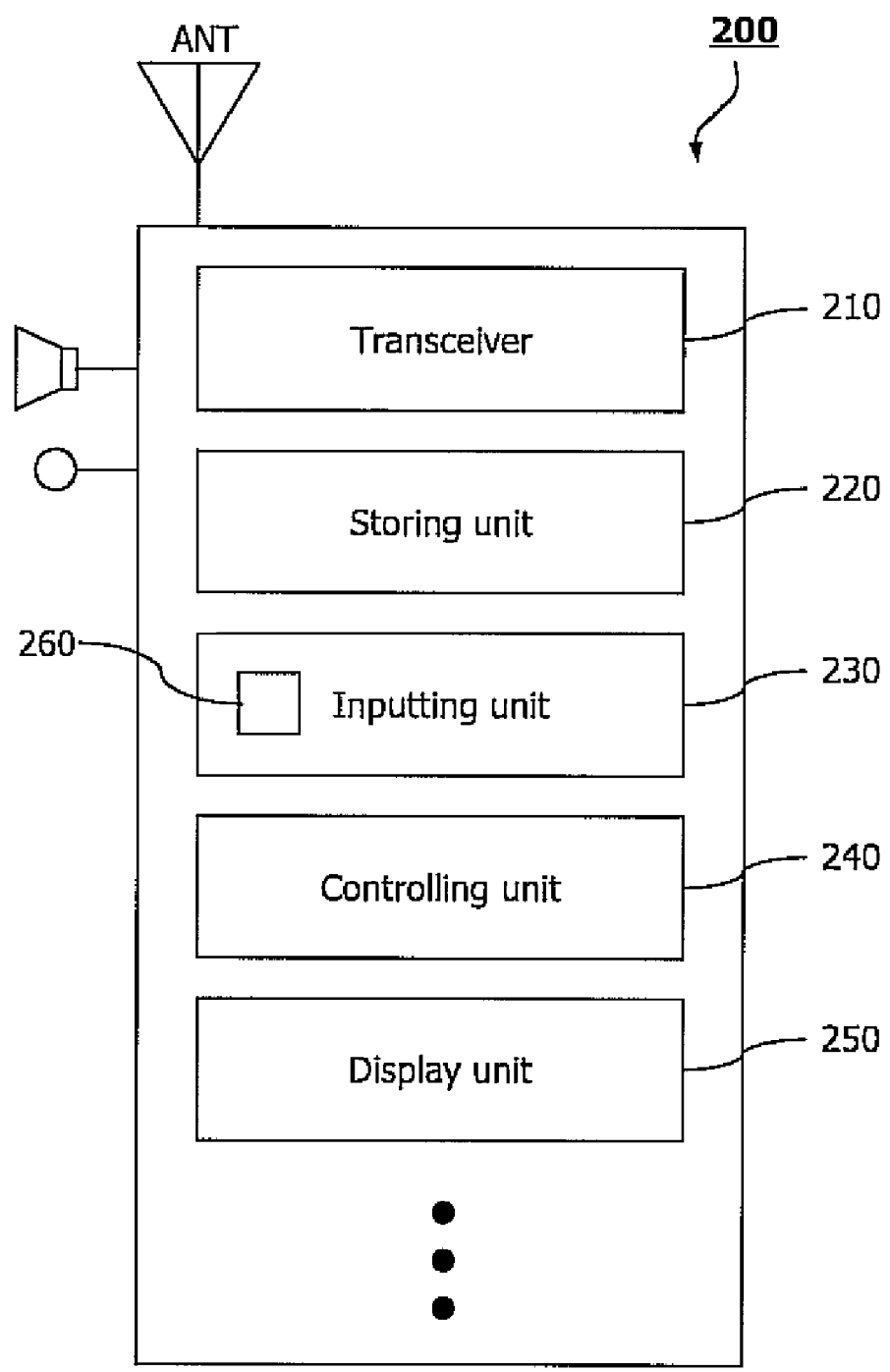
FIG. 2 is a view showing a configuration of the mobile telecommunication handset capable of switching between screens using an abbreviation key according to an embodiment of the present invention.

The abbreviation key 130 is set to temporarily store the composing-unfinished message and display a list of the received messages when pressed during the time of composing a new message, The abbreviation key 130 is set to display the composing-unfinished message when pressed during the time of displaying the list of the received messages or the contents of the received message The abbreviation key 130 is not limited to the separately-provided key as shown in FIG. 1, but may include a key, such as an Internet access key or a volume control key, which is not in use during the time of composing the short message or reading again the received short message. Referring to FIG. 2, the operation of the mobile telecommunication handset according to an embodiment of the present invention is now described FIG. 2 is a view showing a configuration of the mobile telecommunication handset capable of switching between screens using an abbreviation key according to an embodiment of the present invention.

As shown in FIG. 2, the mobile telecommunication handset 200 includes a receiving/transmitting unit 210 receiving and transmitting a data call including a short message or a voice call, a storing unit 220 storing various information such as the short message, an input unit 230 enabling the information to be input, a controlling unit 240 enabling an incoming mail box to be displayed when the abbreviation key is pressed, and a display unit 250 displaying the information for a user and being enabled by the controlling unit 240 to switch to displaying the incoming mail box from displaying a short message composing screen The control unit 240, when the abbreviation key is pressed, determines if the short message is being composed or edited. When the short message is determined as being composed or edited, the control unit 240 temporarily stores the composing-unfinished short message in the storing unit 220 and then enables the incoming mail box or the received short message to be displayed on the display unit 250.

The controlling unit 240, when the abbreviation key 260 is pressed during the time of displaying the received short message, determines if the composing-unfinished short message is stored. When the composing-unfinished short message is stored, the controlling unit 240 retrieves the composing-unfinished message from the storing unit 220 and displays the composing-unfinished short message on the displaying unit 250, Then the user can resume his/her composing of the composing-unfinished short message.

When the composing-unfinished short message is not stored, the controlling unit 240 enables the short message composing screen to be displayed in order for the user to compose a new short message on the short message composing screen.

For example, the user, when he wants to read again the received short message stored in the incoming mail box during the time of composing a short message, can switch directly to the incoming mail box to read again the received short message by pressing one time the key which is set to serve as the abbreviation key, without having to stop composing the short message and press several keys to read again the received short message.

The user, when he/she receives a short message during the time of composing a short message, can instantly display the short message to be read, by pressing the abbreviation key one time The user, when he/she wants to resume composing the composing-unfinished the short message after reading the received short message, can instantly display the composing-unfinished short message and switch to composing the composing-unfinished short message by pressing the abbreviation key one time without switching to the short message storing box.

Figure 3:
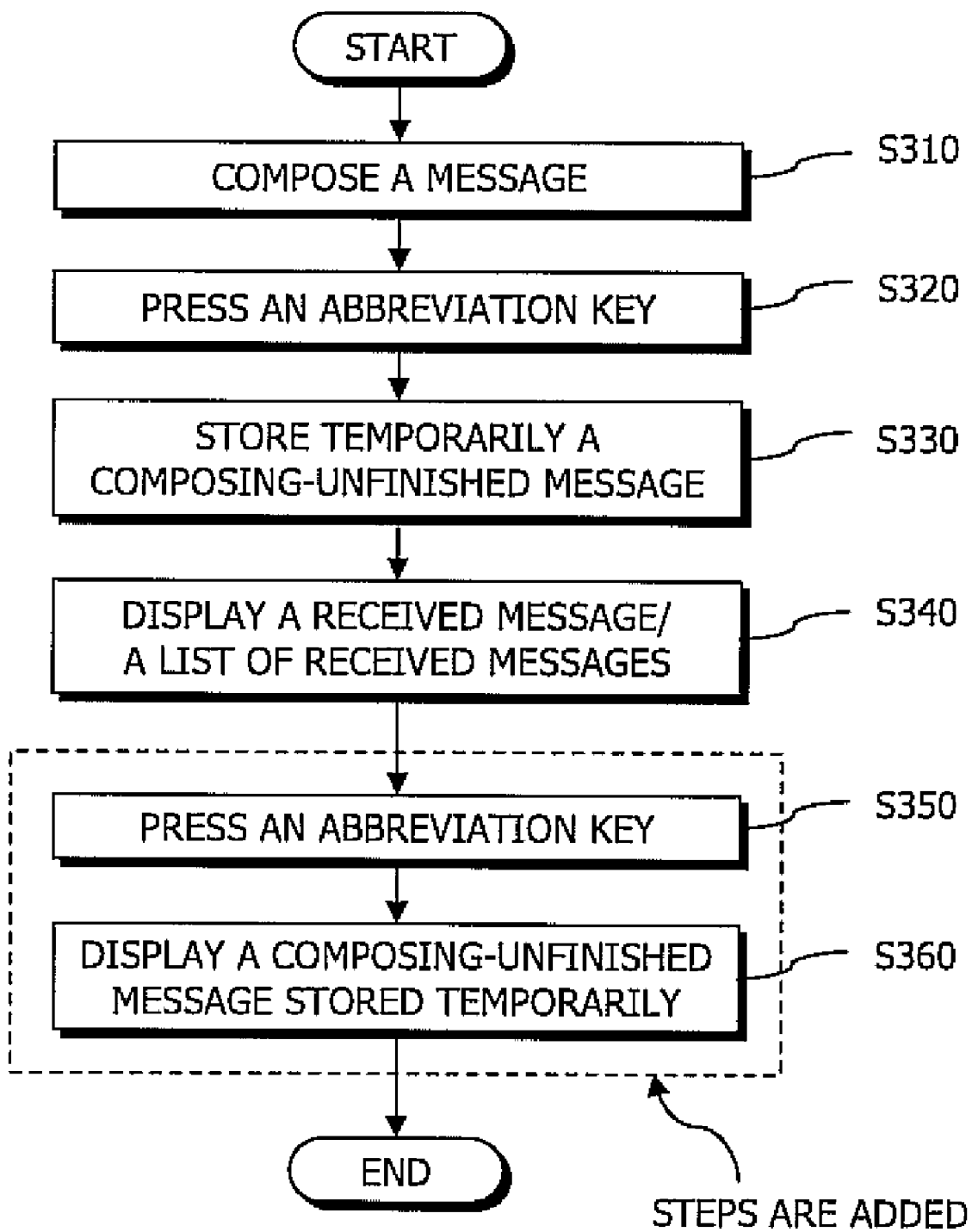
FIG. 3 is a flow chart showing a method of switching between screens using an abbreviation key in the mobile telecommunication handset according to the embodiment of the present invention.

The user, when he/she wants to send a short message to another recipient during the time of reading the received short message, can display a short message composing screen on which to compose the short message by pressing the abbreviation key one time The abbreviation key to press to switch to the received short message or the list of the received short messages from the short message composing screen may be identical to or different from the abbreviation key to press to switch to the composing-unfinished short message or switch to the short message-composing screen FIG. 3 is a flow chart showing a method of switching between screens using an abbreviation key in the mobile telecommunication handset according to the embodiment of the present invention.

As shown in FIG. 3, the method of switching between screens using an abbreviation key in the mobile telecommunication handset, includes pressing a first abbreviation key (S320) while a short message is being composed on the short message-composing screen (S310), temporarily storing the composing-unfinished short message (S330) and displaying a received short message or a list of received short messages (S340).

The method of switching between screens using an abbreviation key in the mobile telecommunication handset further includes pressing a second abbreviation key while the received short message or the list of the received short messages is displayed (S350), and displaying the composing-unfinished short message which is temporarily stored (S360)

The user, while composing or editing the short message on the short message composing or editing screen (S310), can store the composing-unfinished short message temporarily and automatically (S330) and display the received short message and the list of the received short messages (S340) by pressing the first abbreviation key to read the received short message (S320). At this point, the user, after reading the received short message, can switch to the short message composing or editing screen to resume his/her composing of the composing-unfinished short message (S360) by pressing the second abbreviation key (S350)

The first abbreviation key may be identical to or different from the second abbreviation key The method of switching between screens using an abbreviation key in the mobile telecommunication handset and an exemplary case where the method is applied to the mobile telecommunication handset are now described. The first abbreviation key is hereinafter identical to, but may be different from the second abbreviation key.

FIGS. 4A through 4D are exemplary views helping explain about the method of switching between screens using an abbreviation key in the mobile telecommunication handset and an exemplary case where the method is applied to the mobile telecommunication handset. Assume that the user composes a short message in response to a received short message by selecting a "response" item from the menu, read again the received short message during the composing of the responding short messages and resumes his/her composing of the composing-unfinished responding short message after reading again the received short message.

Figure 4A:
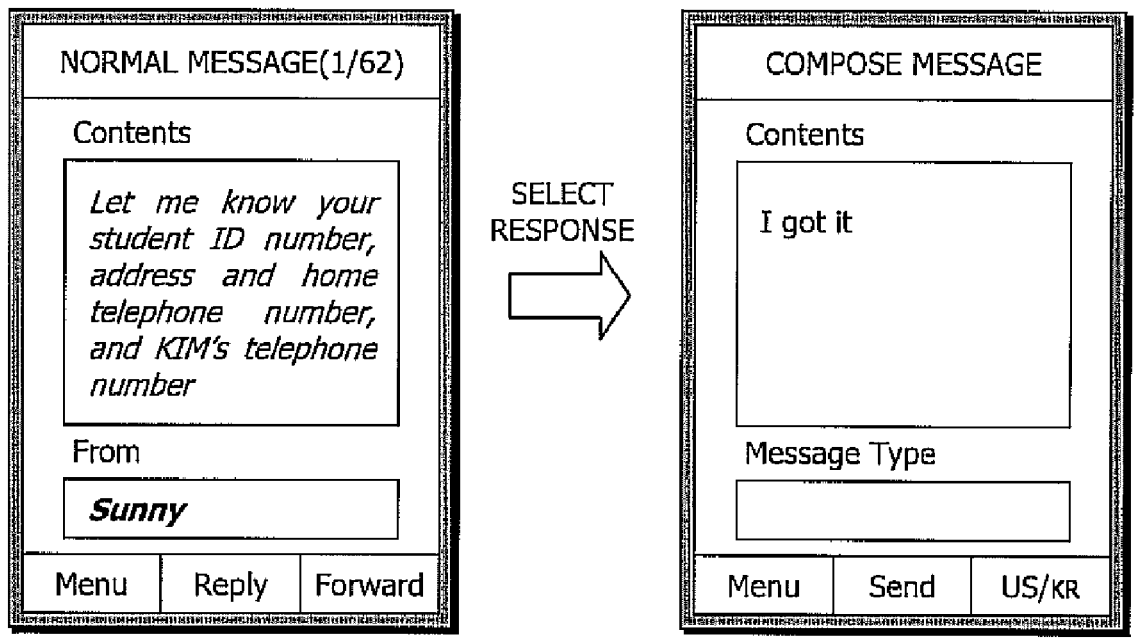
FIGS. 4A through 4D are exemplary views helping explain about the method of switching between screens using an abbreviation key in the mobile telecommunication handset and an exemplary case where the method is applied to the mobile telecommunication handset.

Referring to FIG. 4A, the received short message "Let me know your student ID number, address and home telephone number, and YOUJIN's telephone number" and the sender name "MISOON" are displayed on the left screen in FIG. 4A. At this point, when "response" is selected from the menu, the short message-composing screen is displayed as shown on the right screen in FIG. 4A. On the short message-composing screen, the user composes the responding short message "I got it".

Figure 4B:
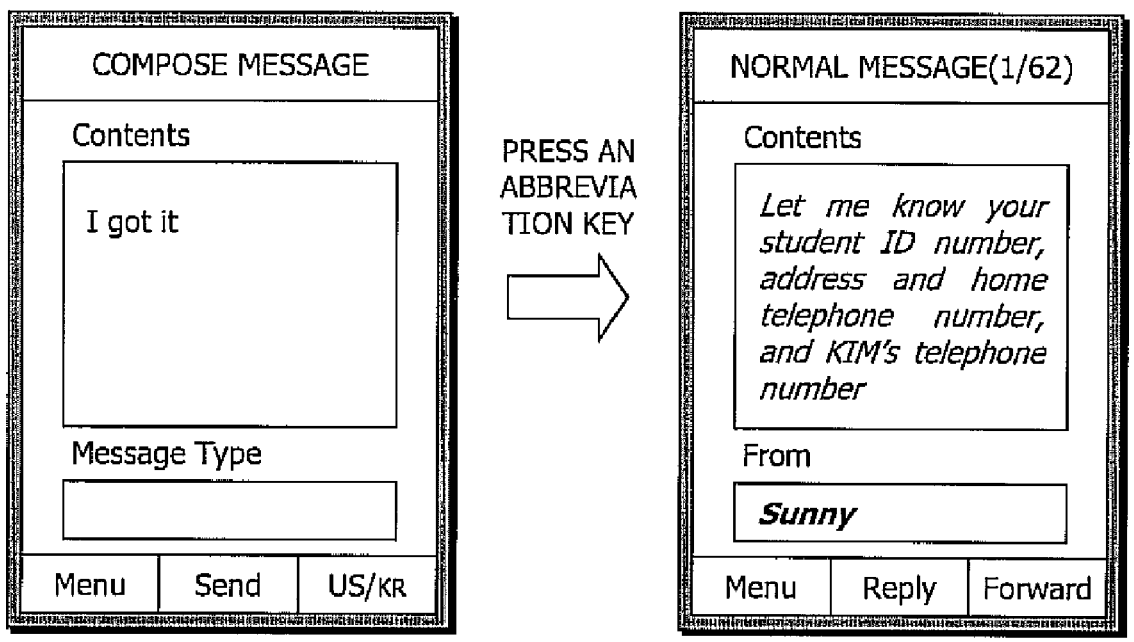

The responding short message "I got it" is displayed on the left screen in FIG. 4B. At this point, when the abbreviation key is pressed to read again the received short message, the composing-unfinished short message "I got it" is temporarily stored and the received short message "Let me know your student ID number, address and home telephone number and YOUJIN's telephone number" is again displayed as shown on the right screen in FIG. 4B. Thus the user can conveniently make certain of the contents of the received short message "Let me know your student ID number, address and home telephone number and YOUJIN's telephone number" during the composing of the responding short message.

Figure 4C:
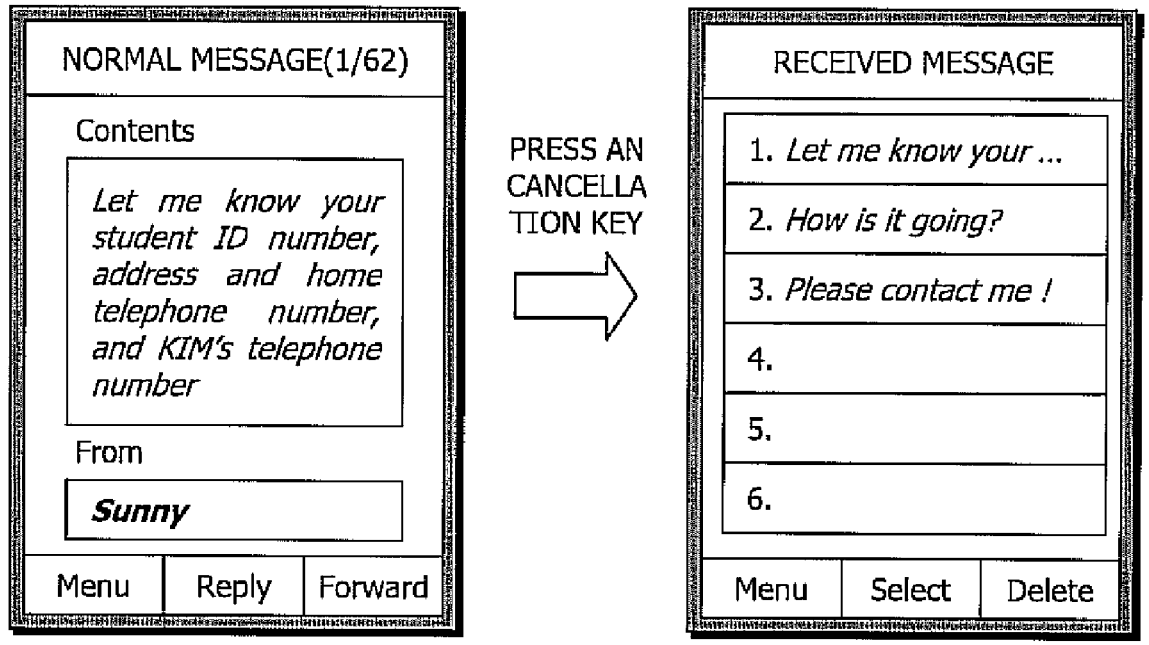

The received short message, when the abbreviation key is pressed, displayed as shown on the left screen in FIG. 4C. At this point, when necessary to read again other received short messages, the list of the received short messages "(1). Let me know your student ID . . . (2) How is it going? (3) Please contact me. (4) . . . (5) . . . (6) . . . " are displayed as shown on the right screen in FIG. 4C by pressing a specific key such as a "CANCEL" key which serves to cancel a specific function. A function key such as a scrolling key or a confirming key is scrolled or pressed to select the received short message to read again from the list of the received short messages by scrolling or pressing the specific key.

Figure 4D:
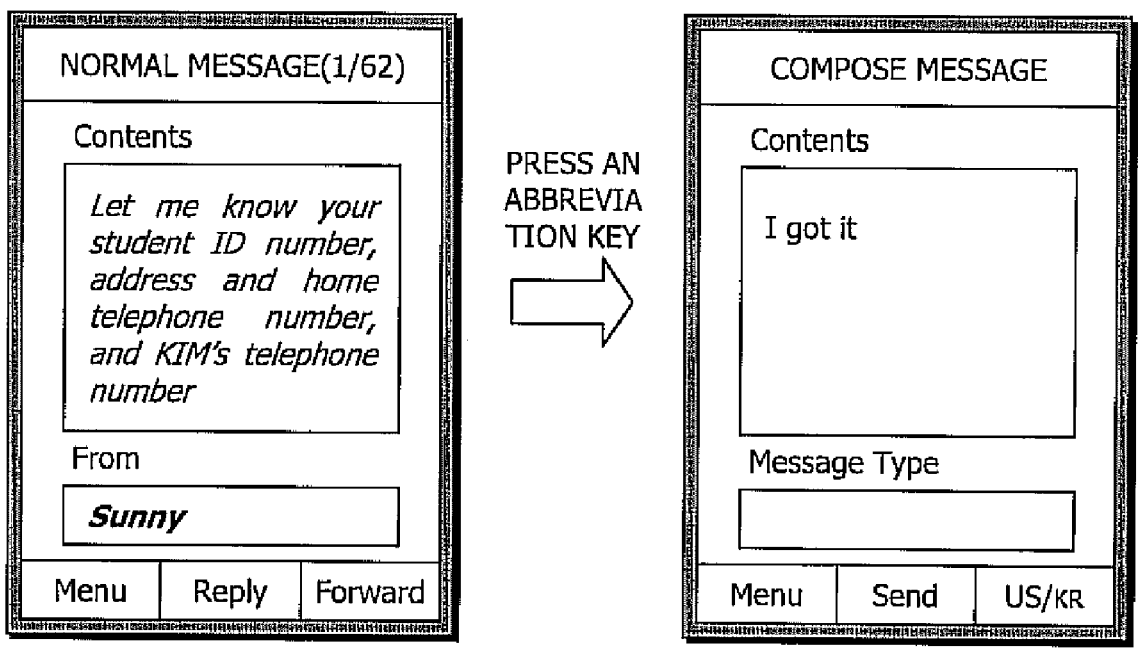

The received short message, when the abbreviation key is pressed, is displayed as shown on the left screen in FIG. 4D. At this point, when necessary to switch to the composing-unfinished short message, the composing-unfinished short message, which is temporarily stored, is displayed as shown on the right screen in FIG. 4D by pressing the abbreviation key. Thus the user resumes his/her composing of the composing-unfinished short message.

To resume his/her composing, the user can switch to the composing-unfinished short message, "I got it" as shown on the right screen in FIG. 4D, from the screen showing the list of the received short messages "(1). Let me know your student ID . . . (2) How is it going? (3) Please contact me. (4) . . . (5) . . . (6) . . . " as shown in the right screen in FIG. 4C or from the other received short message selected from the list of the short messages by pressing the abbreviation key one time The application of the present invention is not limited to the composing of the responding short message by selecting the "response" item from the menu, but may include the composing of a new short message by selecting the "create message" item from the menu.

For example, assume that the user wants to read again the received short message while he is composing the short message on the short message composing screen. The user switches to the incoming mail box by pressing the abbreviation key. The user selects from the mail box the received short message which he want to read again. After reading again the received short message, the user switches to the composing-unfinished short message by pressing the abbreviation key. The user resumes his/her composing of the composing-unfinished short message.

Figure 5C:
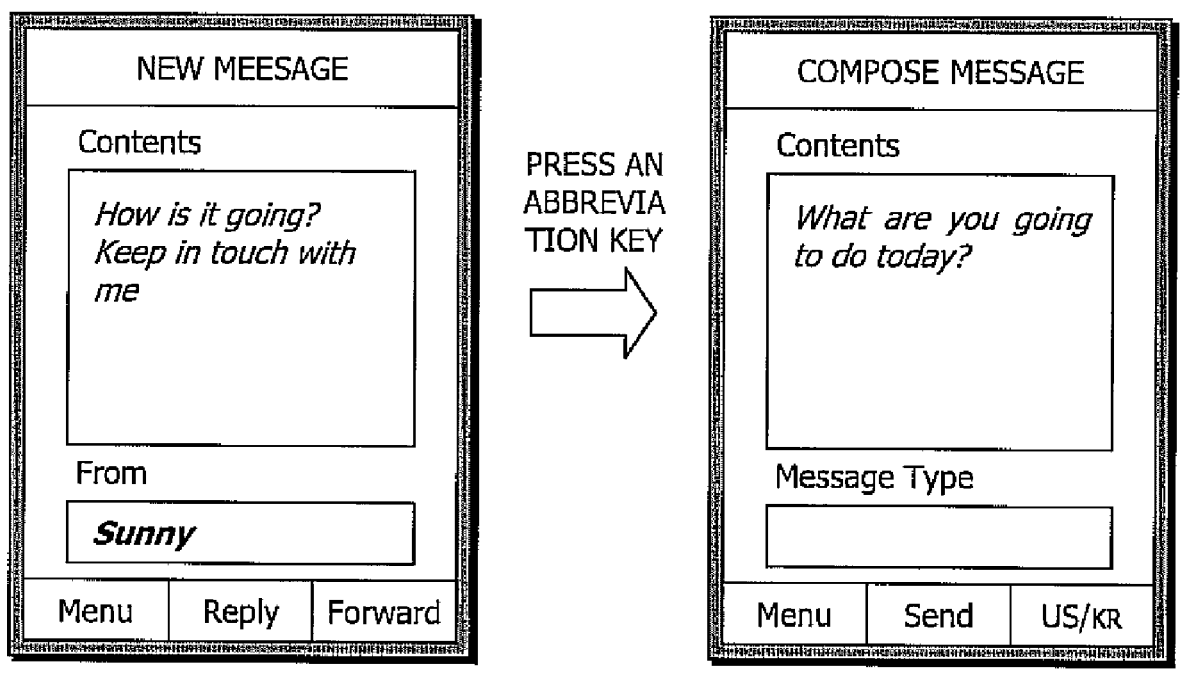

FIGS. 5A through 5C are exemplary views helping explain about the method of switching between screens using an abbreviation key in the mobile telecommunication handset and another exemplary case where the method is applied to the mobile telecommunication handset. Assume that the user receives a short message while composing a new short message and he wants to proceed to compose the new short message after reading the received short message.

The short message "What are you going to do today?" which the user composes on the short message-composing screen, is displayed as shown on the left screen in FIG. 5A. At this point, when the new short message is received, the user can temporarily store the composing-unfinished short message "What are you going to do today?" and switch to the received short message "How is it going? Keep in touch with me", by pressing the abbreviation key.

The new received short message "How is it going? Keep in touch with me" is displayed as shown in the right screen in FIG. 5B. At this point, when necessary to read again another short received short message, the user can display the list of the received short messages "(1). Let me know your student ID . . . (2) How is it going? (3) Please contact me. (4) . . . (5) . . . (6) . . . " as shown in the right screen in FIG. 5B, by pressing a key which is set to perform a cancelling function, such as the "CANCEL" key;

The new received short message "How is it going? Keep in touch with me" is displayed as shown in the left screen in FIG. 5C. At this point, the user can switch to the composing-unfinished short message "What are you going to do today?" as shown in the right screen in FIG. 5C to resume his/her composing by pressing the abbreviation key To resume his/her composing, the user can switch to the composing-unfinished short message, "What are you going to do today?" as shown on the right screen in FIG. 5C, from the screen showing the list of the received short messages "(1). Let me know your student ID . . . (2) How is it going? (3) Please contact me. (4) . . . (5) . . . (6) . . . " as shown in the right screen in FIG. 5B or from the other received short message selected from the list of the short messages, by pressing the abbreviation key one time The method of switching between screens using an abbreviation key in the mobile telecommunication handset and the mobile telecommunication handset capable of switching between screens using an abbreviation key make it possible to read again the received short message during the time of composing a short message by pressing at least one abbreviation key, and to switch to the composing-unfinished short message to resume the composing of the short message by pressing at least one abbreviation key. This provides the user with an advantage of promptly switching between screens in composing the short message.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A mobile telecommunication handset comprising:
   a display unit;
   a keypad having at least one abbreviation key for switching from one display screen to another display screen on the display unit in a single step;
   a storage unit configured to store at least one message; and
   a control unit configured to temporarily store a message being composed in the storage unit and switch a display screen on the display unit in the single step when an input is received via the at least one abbreviation key,
   wherein upon receiving the input via the at least one abbreviation key, the control unit is further configured to:
      switch a message composing screen that displays the message being composed to a screen for displaying contents of a newly received message when the contents of the newly received message have not been checked yet;
      switch the message composing screen to a screen for displaying a list of previously received messages when no new message has been received;
      determine whether a temporarily stored message is present in the storage unit when the at least one abbreviation key is selected while displaying the screen for the list of the previously received messages or the screen for the contents of the newly received message;
      retrieve the temporarily stored message from the storage unit and display the message composing screen comprising the retrieved message that has been composed on the display unit upon determining presence of the temporarily stored message in the storage unit; and
      display the message composing screen for composing a new message upon determining that no message is temporarily stored in the storage unit.

2. The handset according to claim 1, wherein the control unit is further configured to temporarily store the composed message of the message composing screen and to switch to the screen for displaying the contents of the newly received message on the display unit when the at least one abbreviation key is selected while a reply message is being composed in response to the received message.

3. The handset according to claim 1, wherein the control unit is further configured to temporarily store the composed message of the message composing screen and to switch to the screen for displaying the list of the previously received messages in an incoming mail box when the at least one abbreviation key is selected while an entirely new message is being composed.

4. The handset according to claim 1, wherein a screen currently displayed on the display unit is replaced by a new screen when the display screen is switched upon selection of the at least one abbreviation key.

5. The handset according to claim 1, wherein the message composing screen and the screen for displaying the contents of the newly received message are not displayed at the same time on the display unit.

6. The handset according to claim 1, wherein each of the message composing screen, the screen for displaying the contents of the newly received message, the screen for displaying the list of previously received messages, and the message composing screen is displayed on the display unit independently.

7. The handset according to claim 1, wherein an entire screen of the display unit is switched when the display screen is switched.

8. A method for controlling a mobile telecommunication handset having at least one abbreviation key, wherein upon selection of the at least one abbreviation key, the method comprising:
   temporarily storing a message being composed in a storage unit of the handset when an input is received via the at least one abbreviation key;
   switching a message composing screen to a screen for displaying contents of a newly received message when the contents of the newly received message have not been checked yet;
   switching the message composing screen to a screen for displaying a list of previously received messages when no new message has been received;
   determining whether a temporarily stored message is present in the storage unit when the at least one abbreviation key is selected while displaying the screen for the list of the previously received messages or the screen for the contents of the newly received message;
   retrieving the temporarily stored message from the storage unit and displaying the message composing screen comprising the retrieved message that has been composed upon determining presence of the temporarily stored message in the storage unit and displaying the message composing screen for composing a new message upon determining that no message is temporarily stored in the storage unit, wherein the at least one abbreviation key is configured to switch from one display screen to another display screen on a display of the mobile telecommunication handset in a single step.

9. The method of claim 8, further comprising:

temporarily storing the composed message of the message composing screen and switching to the screen for displaying the newly received message, if the composed message is a reply message, when the at least one abbreviation key is selected while the reply message is being composed in response to the received message.

10. The method of claim 8, further comprising:

temporarily storing the composed message of the short message composing screen in the storage unit and switching to the screen for displaying a list of the received messages in an incoming mailbox, if the composed message is an entirely new message, when the at least one abbreviation key is selected while the entirely new message is being composed.

11. The method of claim 8, wherein a currently displayed screen is replaced by a new screen when a display screen is switched from one screen to another screen upon selection of the at least one abbreviation key.

12. The method of claim 11, wherein an entire screen on a display of the handset is switched when the display screen is switched.

13. The method of claim 8, wherein the message composing screen and the screen for displaying the contents of the newly received message are not displayed at the same time.

14. The method of claim 8, wherein each of the message composing screen, the screen for displaying the contents of the newly received message, the screen for displaying the list of previously received messages, and the message composing screen is displayed independently.

15. A method for switching between screens on a display of a mobile telecommunication handset having at least one abbreviation key, the method comprising:

temporarily storing a message being composed in a storage unit of the handset when the at least one abbreviation key is selected while composing the message;

switching from a first screen to a second screen responsive to the selection of the at least one abbreviation key, wherein the first screen is for composing the message and the second screen displays contents of a newly received message or a list of previously received messages depending on whether a new message has been received;

retrieving the temporarily stored message from the storage unit and displaying a third screen comprising the retrieved message; and displaying a fourth screen for composing a new message when no message is temporarily stored in the storage unit, wherein the first, second, third, and fourth screens are not displayed at the same time on the display such that each of the first, second, third, and fourth screens is displayed independently on the display, and wherein the at least one abbreviation key is configured to switch from one display screen to another display screen on a display of the mobile telecommunication handset in a single step.

* * * * *